US012701603B1

(12) United States Patent
Tseng et al.

(10) Patent No.: US 12,701,603 B1
(45) Date of Patent: Aug. 4, 2026

(54) UPDATING A REQUEST DURING PROPAGATION AMONG SERVICES TO INCLUDE DIFFERENT PRIORITY VALUES FOR REQUEST PROCESSING

(71) Applicant: Amazon Technologies, Inc., Seattle, WA (US)

(72) Inventors: Jui Te Tseng, Edmonds, WA (US); Eva Lacy, Maynooth (IE); Avinash Nagasundaram, Bellevue, WA (US); Forrest MacKenzie Vines, Bonney Lake, WA (US); Issa Rashid Fattah, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 880 days.

(21) Appl. No.: 17/937,392

(22) Filed: Sep. 30, 2022

(51) Int. Cl.
  H04W 72/56 (2023.01)
  H04L 47/10 (2022.01)
(52) U.S. Cl.
  CPC ............. H04W 72/56 (2023.01); H04L 47/23 (2013.01)
(58) Field of Classification Search
  CPC ............................... H04W 72/56; H04L 47/23
  See application file for complete search history.

(56) References Cited

U.S. PATENT DOCUMENTS

| | | | |
|---|---|---|---|
| 7,359,986 B2 | 4/2008 | Madhavapeddi et al. | |
| 11,153,225 B2 | 10/2021 | Lehane et al. | |
| 2003/0188013 A1* | 10/2003 | Nishikado | H04L 67/563 |
| | | | 709/207 |
| 2007/0124463 A1 | 5/2007 | Madhavapeddi et al. | |
| 2013/0066943 A1 | 3/2013 | Canning et al. | |
| 2014/0297848 A1* | 10/2014 | Sanamrad | G06Q 10/06395 |
| | | | 709/224 |
| 2015/0149623 A1* | 5/2015 | Numata | H04L 67/125 |
| | | | 709/224 |
| 2015/0201394 A1* | 7/2015 | Qu | H04W 4/20 |
| | | | 455/456.1 |
| 2016/0147826 A1* | 5/2016 | Mishra | G06Q 10/063112 |
| | | | 707/736 |
| 2016/0323192 A1* | 11/2016 | Chen | H04L 47/70 |
| 2019/0159219 A1* | 5/2019 | Hosseini | H04W 72/56 |

* cited by examiner

*Primary Examiner* — Sujoy K Kundu
*Assistant Examiner* — Raul Rivas
(74) *Attorney, Agent, or Firm* — Robert C. Kowert; Kowert, Hood, Munyon, Rankin & Goetzel, P.C.

(57) ABSTRACT

Various techniques are described for updating a request during propagation among services to include different priority values. Each service may determine its own priority for a request and add that priority to the request's overall priority value before propagating the request to the next service. When an overloaded service receives multiple requests, it may order the requests into a queue based on the different priority values. This may allow multiple different services to affect the priority/importance of any given request. A service may use the different priorities in order to determine the lowest priority requests that should be dropped when a queue needs to make room for a higher priority request.

20 Claims, 7 Drawing Sheets

Receive, by a service, a request from a client
502

Determine, based on attribute(s) associated with the request, a first priority value for the request; the first priority value indicates a priority of the request relative to other requests received by the service
504

Update the request to include the first priority value, resulting in a first updated request
506

Propagate the first updated request to another service
508

Determine, based on attribute(s) associated with the first updated request, a second priority value for the first updated request; the second priority value indicates a priority of the first updated request relative to other requests received by the other service
510

Update the first updated request to include the second priority value, resulting in a second updated request
512

Propagate the second updated request to an additional service
514

302

| Description | Priority in group | Is default | Binary | Decimal |
|---|---|---|---|---|
| URL prefix/cart | 3 | FALSE | 0.111 | 0.875 |
| URL prefix/gp/product | 2 | FALSE | 0.110 | 0.75 |
| URL prefix/gp/product (w/hot cust ID) | 1 | FALSE | 0.101 | 0.625 |
| URL prefix/bsb | | TRUE | 0.100 | 0.5 |
| URL prefix/your orders | 3 | FALSE | 0.011 | 0.375 |
| URL prefix/apb | 3 | FALSE | 0.011 | 0.375 |
| URL prefix/apb (w/hot cust ID) | 2 | FALSE | 0.010 | 0.25 |
| URL prefix/gp/other | 1 | FALSE | 0.001 | 0.125 |
| URL prefix/gp/ | 0 | FALSE | 0.000 | 0 |

*FIG. 3*

UPDATING A REQUEST DURING PROPAGATION AMONG SERVICES TO INCLUDE DIFFERENT PRIORITY VALUES FOR REQUEST PROCESSING

BACKGROUND

Websites often handle a large number of requests from internet users in order to perform various actions. For example, a service provider's network may provide an ecommerce website that allows many different users to search for products that are available for purchase, to purchase those products, and to have the products delivered to a location. A service provider may consider different types of requests to have different levels of importance. For example, a request from a website user to purchase an item (e.g., by pressing a "checkout" button) may be considered more important (e.g., higher in priority) than a request from a different user to view product reviews for that item. As another example, a request that was generated in response to input from a human user of the website may be considered higher in priority than a request that was generated by a robot without any human input involved (e.g., a software program).

If a particular service (e.g., software application) that handles processing of requests for an ecommerce website becomes overloaded and needs to drop one of the requests that it has received (e.g., reject or redirect the request to another service), the service provider may wish to drop a lower priority request instead of higher priority request. However, it may be difficult to determine relative priorities among a massive number of requests, particularly as the different requests propagate among multiple services during processing of those requests.

BRIEF DESCRIPTION OF THE DRAWINGS

FIG. 3 illustrates an example of different priority values that may be assigned by a service to a given request based on different URL prefixes of the given request, according to some embodiments.

Figure 1:
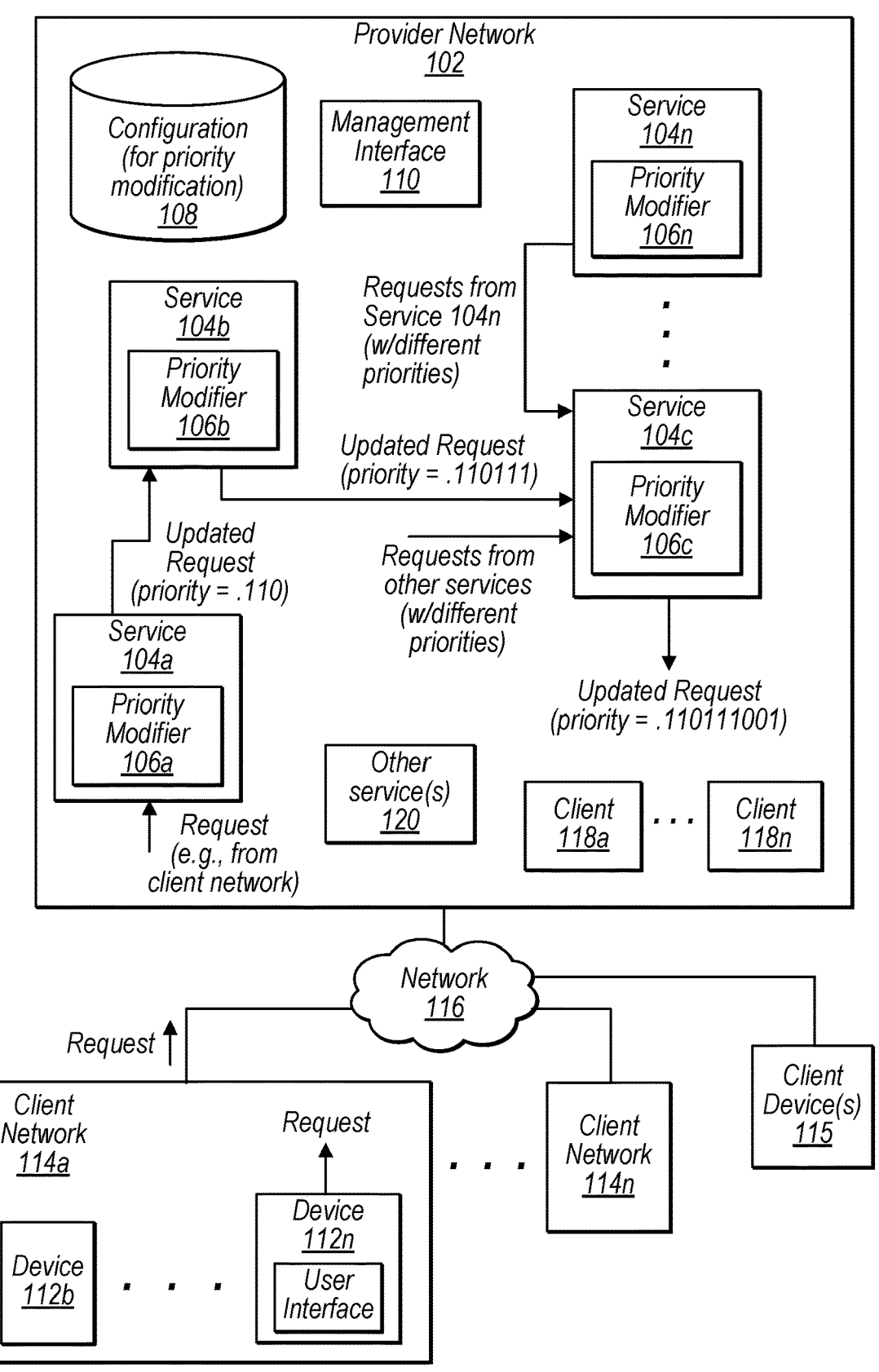
FIG. 1 illustrates a system for updating a request during propagation among services to include different priority values for request processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for updating a request during propagation among services to include different priority values for request processing, according to various embodiments. In embodiments, in order to service a request received from a given client (e.g., a website request), a provider network may implement multiple services that each receive the request, process the request (e.g., update the request and/or perform one or more operations based on the request), and/or propagate the request to another service of the provider network.

In embodiments, a request received from a client (e.g., from device of a remote client network or the provider network) may be propagated through multiple different services of the provider network for processing until the processing of the request is complete. In some embodiments, the request may also be propagated through one or more services of the client's network and/or third-party networks for processing until the processing of the request is complete. As described herein, the request may be updated during propagation among services to include different priority values that are used for request processing.

In some embodiments, a newly received request at a service may be added to a group of requests (e.g., a queue) according to a particular sequential order based on one or more priority values of the request and/or one or more priority values of each of the other requests of the group. In some cases, before the newly received request is added to the group, one of the requests of the group may first be dropped based on the one or more priority values of the request and/or the one or more priority values of each of the other requests of the group (in order to free up a location in the queue for the newly received request).

Embodiments may reduce unnecessary usage of computing resources and/or bandwidth of a provider network by dropping requests according to different priority values when a given service becomes overloaded (e.g., receives more requests than it can handle). By dropping lower priority requests instead of higher priority requests (based on different priority values assigned by different services), the provider network may improve its efficiency in handling requests by reducing unnecessary and/or unwanted resource usage.

For example, a request that originated from a robot may be assigned a lower priority than a request that originated from human because the human may be more likely to make a purchase and/or perform other desirable actions. As another example, a request that was assigned lower priority values by three different services may be less desirable than a request that was assigned a higher priority by at least two of those three services, because processing of the request may be more likely to result in desirable results (e.g., a purchase of a product on a website). In various embodiments, the assignment of different priority values to a given request by different services may result in a more accurate determination of the relative desirability to complete processing of the given request compared to other requests, which in turn may improve the usage of the provider network's computing and network communication resources, compared to traditional techniques.

Note that in some embodiments, the services that process a request may span across a provider network, a client network, and/or one or more third-party networks. Therefore, at one or more different points during processing of a request for a client, in some embodiments the request may be propagated between services of a provider network, between services of a client network, between services of the provider network and client network, between services of the provider network and third-party network, between services of the client network and third-party network and/or between services of two third-party networks. During processing of the request (e.g., from initially generating and transmitting the request until completion of the request), one, some, or all of the services of each network may perform some or all of the techniques described herein for updating a request during propagation among services to include different priority values for request processing.

In various embodiments, any suitable security communication protocols may be used to protect data that is being sent between any devices and/or services (e.g., client devices, services, etc.) and between devices of different networks (e.g., client networks, provider networks). For example, data may be encrypted using SSL (secure socket layer), TLS (transport layer security), HTTPS (secure hypertext transfer protocol), and/or any other suitable network security protocol.

FIG. 1 illustrates a system for updating a request during propagation among services to include different priority values for request processing, according to some embodiments. A provider network 102, and any other components depicted in FIG. 1 may be the same as or include one or more of the same components as a network and/or any other components discussed in any of FIGS. 2-7, in embodiments. In various embodiments, the provider network and any other components discussed in any one of FIGS. 1-7 may be the same component as (e.g., same type of component) or include one or more of the same components as the provider network and any other components discussed in any other one of FIGS. 1-7.

In the depicted embodiment, the provider network 102 includes multiple services 104 that each include a priority modifier 106 to perform request modifications, determinations, and/or any other functions associated with updating and processing a request as described herein. As shown, the provider network 102 also includes a data store of specifications 108 for priority modification and a management interface 110.

In embodiments, a user or administrator may access (e.g., via an application programming interface) the management interface 110 either locally or from a remote client network (e.g., via a user/admin computing device) to configure operation of one or more of the services 104 (e.g., by entering specifications that affect how priority modifiers update requests for different types of requests). In embodiments, the configuration 108 may store data indicating how a priority modifier 106 adds and/or modifies a priority value for different types of requests (e.g., depending on the value of any number of attributes associated with the request).

In the depicted embodiments, devices 112 on a client network 114 (and/or any number of stand-alone client devices 115 that are not part of a local network, such as a smart phone) may communicate with the provider network 102 (and any services or other components of the provider network) by transmitting data via a wide-area network 116 (e.g., the internet). Thus, the provider network 102 may be considered a remote provider network with respect to the client networks/devices and may be in another physical location than the client networks/devices (e.g., another building, city, state, or country).

As depicted, devices of any number of client networks 114 (e.g., corresponding to different clients of the provider network), devices of other networks, and/or other client devices 115 may communicate with the provider network via the network 116. In embodiments, any number of clients 118 (e.g., devices or services) within the provider network may also communicate with and/or use any of the services 104 of the provider network, in the same or similar way as described herein for remote devices of the client network.

As shown, a device 112n of the client network 114a may send a request to the service 104a. In embodiments, the device may be any type of computing device of the client network that is capable of sending a request for processing by services 104. For example, the device 112a may be a computer of a user and the request may be a request initiated in response to input from a user via a user interface (e.g., clicking a button on a website) to perform an action hosted by the provider network. As another example, the device 112a may be a voice-activated device and the request may be a command triggered by a user's voice to perform an action (e.g., to purchase a product or view information for the product).

In embodiments, the service 104a may be the first service of the website of the provider network to receive the request from the device 112n before the request is propagated to any other services of the website. Therefore, the service 104a may be considered a proxy service, in some embodiments.

In various embodiments, each service 104 may be considered a different system. For example, service A may be considered a system that includes software code and/or hardware components that are used to perform particular functions/services as part of processing a given request, and service B may be considered a different system that includes other software code and/or other hardware components that are used to perform other functions/services as part of processing the given request.

In the depicted embodiment, a priority modifier 106a the service 104a may determine, based on one or more attributes associated with the request, a first priority value for the request. In embodiments, the first priority value indicates a priority of the request relative to other requests received by the service. For example, one of the attributes may be a type of initiator/originator of the request (e.g., human or robot). If the initiator is human, then the service may assign a higher priority value to the request than if the initiator is a robot.

Another example of an attribute is a target destination of the request (e.g., a uniform resource locator (URL) prefix that indicates a search page to search for various types of products or a purchase page for a particular product). In embodiments, the service may assign a higher priority value for requests that indicate the purchase page as the target destination. Another example of an attribute is whether or not the request was initiated by a user/client that is using a cookie. For example, a request from a user that uses a cookie used by the website may be considered higher priority request than a request from a user that does not use the cookie.

In embodiments, a service may use data of a request as an attribute and/or determine an attribute of a request based on data within the request and/or characteristics of the request (e.g., a particular time window the request was received in). For example, one of the attributes may be URL prefix of the request. As another example, the service may analyze any amount of data within the request and/or characteristics of the request in order to determine whether the request was initiated by a human or robot.

In embodiments, the analysis may be performed at least in part by a machine learning (ML) model. In some embodiments, any of the priority values of a request received by a given service 104 may be used by the given service in order to determine one or more of the attributes of the request. Therefore, a given attribute of a request may be determined/derived based on any of the data in the received request.

After determining the first priority value, the service 104*a* updates the request to include the first priority value (generating an updated request that includes the first priority value). In the depicted example, the service assigns the binary decimal value "0.110" as the first priority value. Although the depicted example uses binary values to represent a priority value, in various embodiments any other type of number and/or numerical value suitable for representing a priority may be assigned. For example, in some embodiments, a decimal number may be assigned to the request (e.g., 7 or 13). In embodiments, the use of a binary decimal value may take up less storage space within a request compared to other types of numbers such as decimal. In various embodiments, the priority value(s) may be added to the header of a request, the body of a request, or any other portion of the request.

After the service 104*a* updates the request to include the first priority value, the service 104*a* may propagate the updated request to another service 104*b* of the provider network. In embodiments, the service 104*a* may propagate the request after performing any number of other functions/actions in order to service the request.

As part of processing the updated request, the service 104*b* (and any of the other services 104) may perform any of the actions performed by the service 104*a*. For example, the service 104*b* may determine, based on one or more of attributes associated with the updated request, a second priority value for the updated request. In the depicted example, the service assigns the binary decimal value "0.111" as the second priority value. In embodiments, the second priority value indicates a priority of the updated request relative to other requests received by the service 104*b*.

After determining the second priority value, the service 104*a* updates the request to include the second priority value (generating an updated request that includes the second priority value). As shown, the second priority value may be appended to the first priority value (e.g., appending "111" after removing the decimal) to generate an overall priority value of "0.110111." The service may then propagate the updated request to another service 104*c*. In various embodiments, the above process may be performed by any number of additional services 104, which may result in updating the request to include any number of priority values that each correspond to a different service. As shown, the service 104*c* updates the request to include a third priority value (001), to generate an overall priority value of "0.110111001."

In the depicted example, the service 104*c* also receives different requests from the service 104*n* as well as any number of requests from any number of other services 104. Each of the above requests may include different priority values (e.g., different first priority values and/or second priority values), although in some cases, at least some of the priority values may be the same (depending on what value each service assigns to a given request as it propagates among the services).

As discussed below, a given service may determine, based at least on the first priority value and/or other priority values of the requests that it receives, a sequential order of the received requests. The service may then process the received requests according to the sequential order (e.g., by implementing a queue). In embodiments, when the service is ready to begin processing the next request, it will take the highest priority request from the queue. In an embodiment, a service may decide to opt-in to using a priority value (e.g., "trust" the priority value) for any number of services. For example, service C may trust priority values assigned by service A, but not service B.

As discussed herein, in some embodiments the ordering of the requests in a queue for a service may take into account any number of trusted priority values of the request (each priority value may have been assigned by a different service), different levels of trust that that the service assigns to each of the trusted priority values, and/or arrival times of the requests (e.g., using a heap/last-in-first-out (LIFO) implementation described below for FIG. 6). In embodiments, the service may also drop requests from the queue and add newly received requests to the queue, depending on the different priority values of the previously received requests and the newly received request.

Although various actions are described herein as performed by a given service (e.g., request processing, assigning priority values, ordering requests, adding requests to a queue), some or all of the actions may be performed by other service(s)/application(s), in various embodiments. For example, when service A sends/propagates a request to service B, the request may be redirected to a proxy service or a load balancer (e.g., other service 120). The proxy service or the load balancer may then perform any number of the actions described herein before forwarding the request on to service B (e.g., without service A's knowledge or service B's knowledge). For example, the proxy service or load balancer may receive the request from service A, determine another priority value for the request, update the request to include the other priority value, determine a sequential order of the request relative to other request that were sent/propagated to service B, add the request to a queue of requests for service B according to the sequential order, and/or take the highest priority request from the queue send it on to service B when service B is ready to begin processing the next request.

Figure 2A:
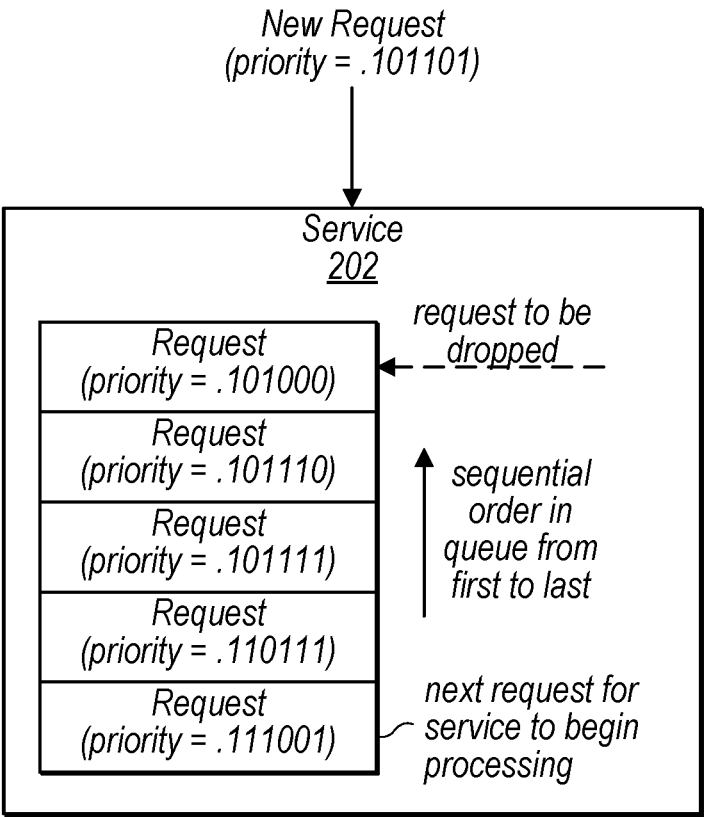
FIG. 2A illustrates an example of a service with a queue of requests to be processed that receives a new request, according to some embodiments.

FIG. 2A illustrates an example of a service with a queue of requests to be processed that receives a new request, according to some embodiments.

As shown, a service 202 receives a request from another service that includes a priority of 0.101101 (e.g., a first priority value of that includes the first three digits "101" assigned by service A and a second priority value that includes the last three digits "101" assigned by service B (e.g., the service that sent the request to service 202). As shown, the service 202 has stored a group of previously received requests in a queue structure into a sequential order from first to last, which corresponds to the order that the service will begin processing the requests as the service becomes available to begin processing additional requests.

In some embodiments, when a service (e.g., service 202) receives a group (e.g., two or more) of different requests from a particular service and receives another request (request X) from another service, the service may determine, based at least on the respective second priority values of the group of different requests, a sequential order of the group of different requests with respect to each other; the service may also determine, based on the first priority value request X and on the first priority value of each of the different requests of the group, a sequential order of request X with respect to the group of different requests. This may allow the service to respect the priority assigned by the particular service (e.g., the second priority value), while also respecting the priority assigned by another service to all of the requests (e.g., the first priority value).

In the depicted example, the service determined the sequential order to store the previously received requests based on the first priority value, and then on the second priority value. In some embodiments, the service may trust the first priority value at a higher level and trust the second priority level at a lower level than the first priority value; therefore, the service may order requests in the queue according to the first priority value, and then consider the second priority value to order the requests, if necessary (e.g., in case two requests have the same first priority values but different second priority values). In some embodiments, the service may trust the first priority value at a higher level and trust the second priority level at a lower level than the first priority value; therefore, the service may order requests in the queue according both the first priority value and the second priority value but with an increased modifier on the first priority value and a decreased modifier on the second priority value. As shown, the first priority value of the first request is 111, the first priority value of the next request is 110, the first priority value of the next request is 101, and the first priority value of the last three requests in the queue is 101. Since the first priority of the last three requests is the same (101), the service ordered the last three requests according to the second priority value (e.g., the last three digits of the priority value, which were assigned by service B). Therefore, the first of those three requests includes the second priority value of 111, followed by the request with the second priority value of 110, followed by the request with the second priority value of 000.

In the example, the queue may be full. As shown, the service 202 may determine, based on the first priority value of the new request matching the first priority value of the last request in the queue, and based on second priority value of the new request being higher than the second priority value of the last request in the queue, that the last request in the queue is to be dropped in order to free space in the queue to add the new request.

Figure 2B:
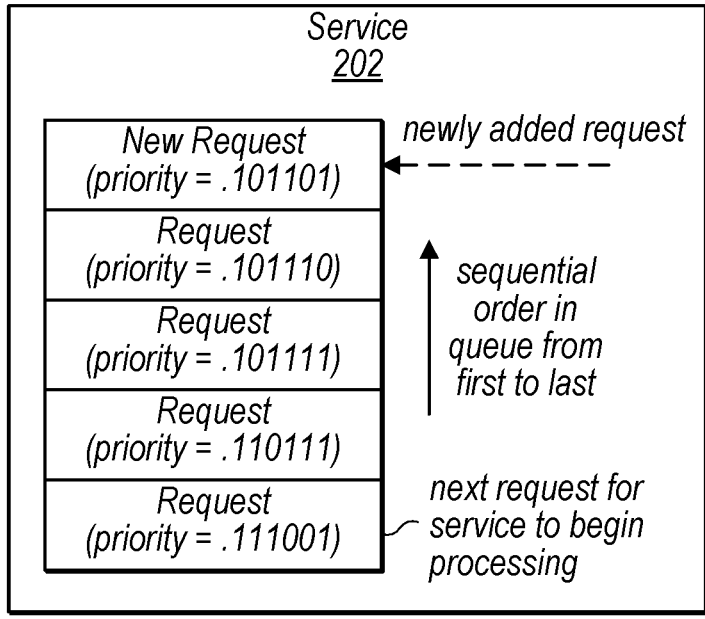
FIG. 2B illustrates an example of a service with a queue of requests to be processed that includes a new request that was added to the queue after dropping another request, according to some embodiments.

FIG. 2B illustrates an example of the service 202 with a queue of requests to be processed that includes the new request that was added to the queue after dropping the other request (the last request in the queue that had the priority value 0.101000). In embodiments, the service may have created the queue of requests because the service was too busy processing other requests to begin processing any new requests.

For example, the service 202 may receive five requests at approximately the same time or within a period of time (e.g., the original five requests shown in FIG. 2A). The service may determine that it is unable to begin processing any of the requests (e.g., due to the service being overloaded/busy processing other requests). In response to the determination, the service may determine the sequential order of the requests (e.g., based on the different priority values, as described above). In the example, the service may add the requests to the queue according to the determined sequential order.

As discussed above, when the service 202 receives the new request, the service determines that the first priority value of the new request is the same as the first priority value of the last request in the queue (101), and that the second priority value of the last request in the queue (000) is lower than the second priority request of the new request as well as any other second priority values of the other requests in the queue that have the same first priority value. Therefore, the service drops the last request in the queue and adds the new request to the queue.

In embodiments, if the first priority value of the last request in the queue had been lower than the first priority value of the new request, then the service would not have needed to compare the second priority values in order to drop the last request. For example, if the first priority value of the last request in the queue was 100 (instead of 101), then the service would have determined that the first priority value of the last request in the queue is lower than the first priority value of the new request and in response, drop the last request in the queue and add the new request to the queue. Therefore, in embodiments, the second priority value may service as a tie breaker in order to determine which request to drop, when the first priority values are the same. The same technique may be used with any levels of priority values as a tie breaker (e.g., using third priority values if the second priority values are the same, using fifth priority values if the fourth priority values are the same, etc.).

FIG. 3 illustrates an example of different priority values that may be assigned by a service to a given request based on different URL prefixes of the given request, according to some embodiments.

In the example embodiment, a service may assign different values 302 to a request depending a URL prefix included in the request. The default value is 0.5 in decimal or 0.1 in binary. If a given prefix of a request has not been assigned a priority value (e.g., the service has not been configured to assign a priority value for the prefix), then the request may be assigned the default value for the priority value.

In embodiments, requests may be split into three different categories: same as default, greater than default, less than default. If the request should have the same value as default, it will be assigned a 0.1. Higher than default values will start with a 1 and have at least 1 other 1 in the number. Lower than default items will start with a 0. Both non-default groups will be assigned a number according to their priority within their group; this will be appended to their 0 or 1. It may be possible to have multiple categories with the same priority value. All priorities may have the same value (unless registered).

In the depicted example, if a request includes a prefix of "apb" and has a "hot" customer ID (e.g., the customer is submitting a much larger number of transactions per second than average), then it may be assigned a lower priority in the group (priority 2, represented as 0.010 or 0.25). If a request includes a prefix of "apb" and does not have a "hot" customer ID, then it may be assigned a higher priority in the group (priority 3, represented as 0.011 or 0.375).

In some embodiments, if a second service/system wishes to further prioritize a value of a request, it can append it to the existing priority value. If a given segment of the priority value should be registered to a particular system (e.g., service), a list with the following type may be appended: 1) the ID number for the system (0 would mean anonymous); and 2) the number of bits appended by the system. This information may be appended to every priority that requires the consumer of the priority to know who created it. Each system may define the registration codes/IDs they trust (e.g., trust all priority, some, or none). In embodiments, the registration codes/IDs are known by parsers and converted to friendly names for generation/display of request traffic metrics to a user.

In various embodiments, "trusted" priorities are used by the services/systems to prioritize traffic. They may be accepted in the order they arrived and prioritized as such or they can be reordered as desired. For example, if service C receives a request that has a priority value "111" assigned by service A and a priority value "001" assigned by service B that was appended by service B, then service C may trust the first priority value from service A at a higher level and trust the second priority value from service B at a lower level than the first priority value. In some embodiments, service C may trust the second priority value from service B at a higher level and trust the first priority value from service A at a lower level than the first priority value (service C may also re-arrange the priority value so that "001" comes first, and "111" is appended to it, in embodiments). Service C may also assign its own priority value to the request as well (e.g., appending to the end or in any other order). In embodiments, trusted priorities may be passed on to dependencies (e.g., other services) by default. As discussed herein, any other information may also be included (e.g., appended) to a priority value (e.g., an ID of the service (e.g., client ID) that assigned the priority value, a size (e.g., number of bits) of the priority value, etc.).

In embodiments, "untrusted" priority is only used when comparing requests from the same client to each other. If the queue is also sorted by arrival time, then requests with a higher client priority can swap their arrival time with requests that have the same trusted priority and a lower client priority so they can jump ahead in the queue. This ensures that in-client prioritization is being respected. If no client ID is present, then the untrusted priority may be ignored. In some embodiments, unless specified by the system, untrusted priority is not passed on by default to dependencies.

Figure 4:
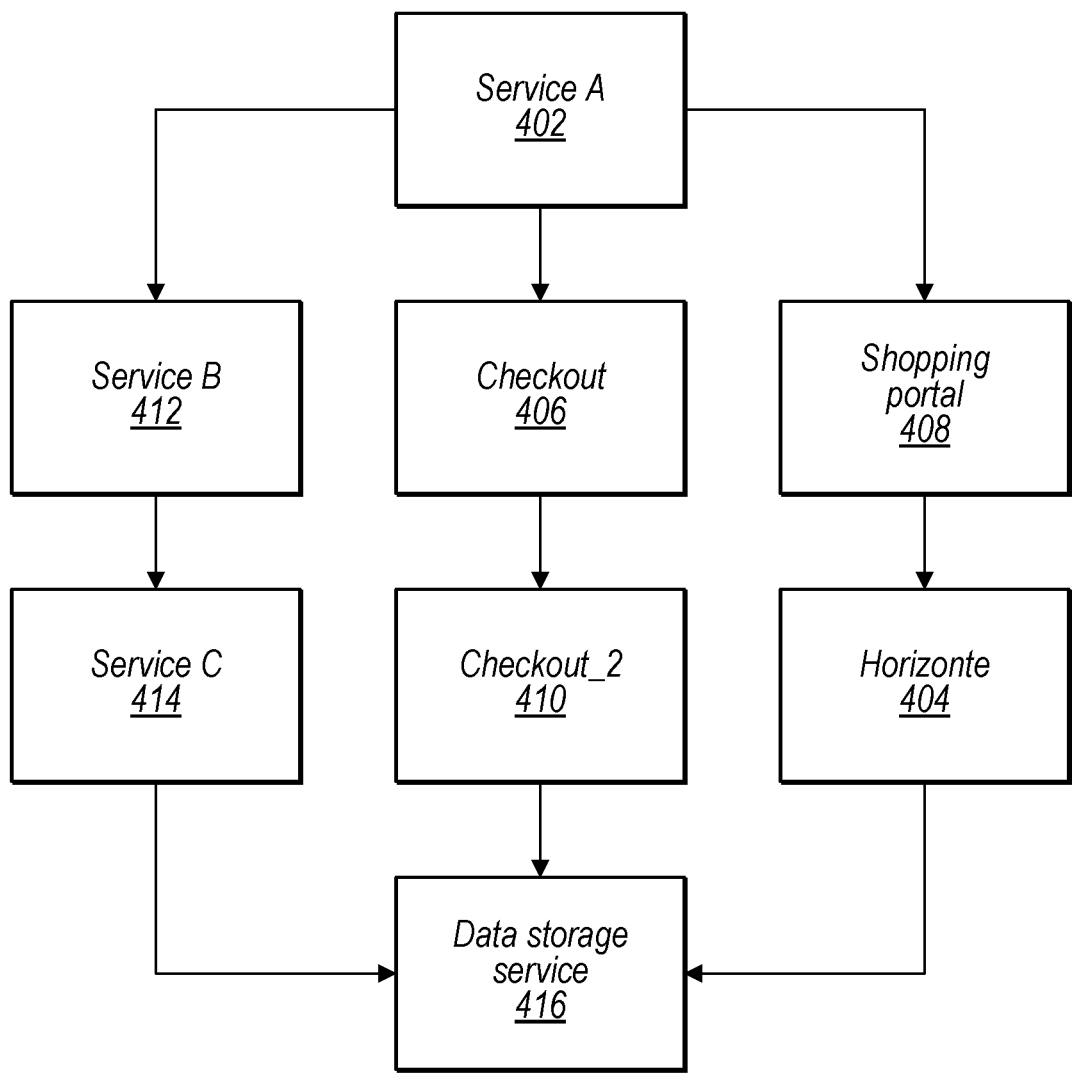
FIG. 4 illustrates a system for updating a request during propagation among services to include different priority values for request processing, according to some embodiments.

FIG. 4 illustrates a system for updating a request during propagation among services to include different priority values for request processing, according to some embodiments.

In the example embodiment of an ecommerce websites, Service A 402 may be a "top" level service (e.g., a proxy service that initially receives a client request), and the other blocks represent other services. Horizonte 404 does not pass on the priority and does not prioritize. Checkout 406 trusts Service A and shopping portal 408 in that order. Checkout applies its own priority for different types of requests (e.g., initiate checkout is higher priority than complete checkout).

In embodiments, Checkout_2 410 trusts all priorities from Checkout. Service B 412 does not prioritize; it trusts Service A and does not trust Shopping portal (but includes it in dependency calls). Service C 414 trusts Service A and Shopping portal in that order. Shopping portal 408 trusts Service A. Data storage service 416 trusts Service A and Shopping portal in that order.

In some embodiments, for requests received by data storage service 416: if from Horizonte, it gets default values for both Service A and Shopping portal; it uses Service A priority first, then if the same, it uses the Shopping portal priority; if from Checkout, it will prioritize a complete checkout request above an initiate checkout request.

Figure 5:
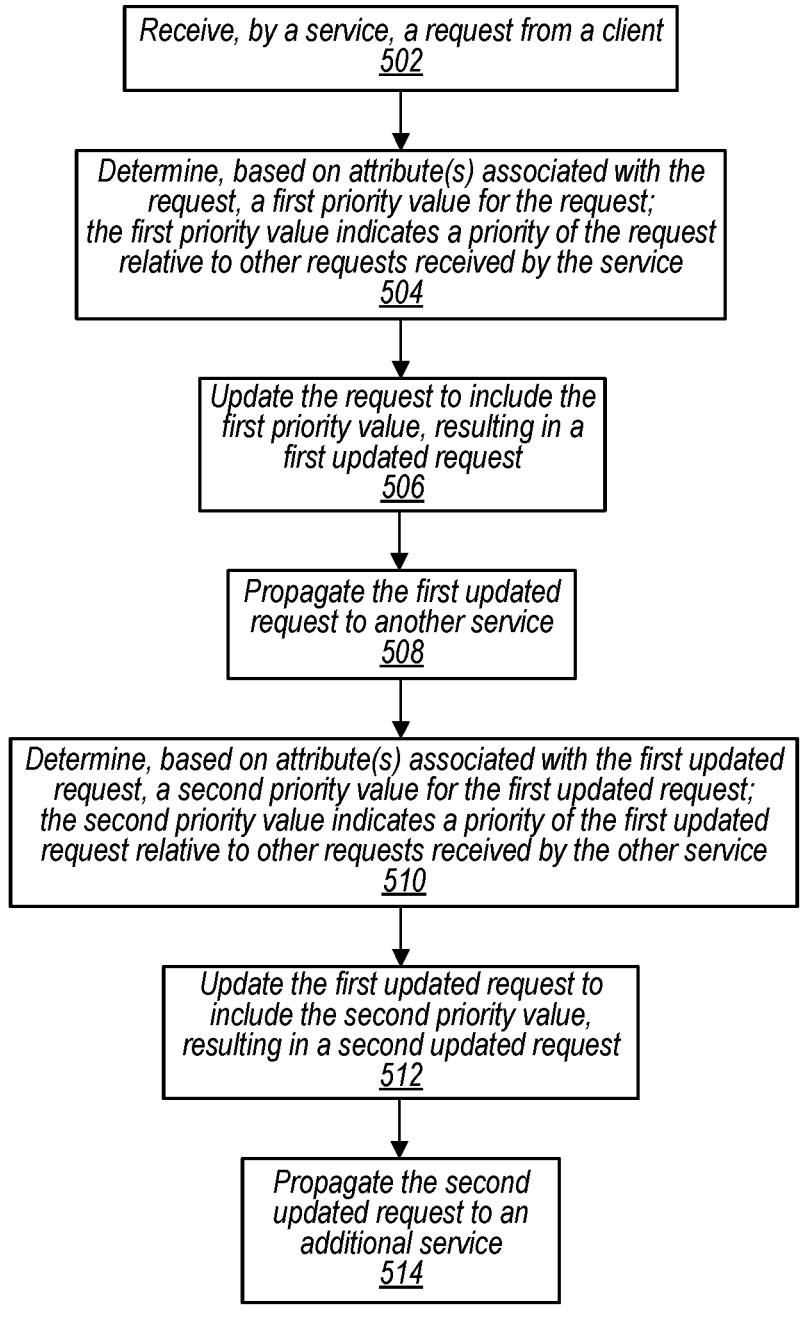
FIG. 5 is a flow diagram that illustrates updating a request during propagation among services to include different priority values for request processing, according to some embodiments.

FIG. 5 is a flow diagram that illustrates updating a request during propagation among services to include different priority values for request processing, according to some embodiments.

At block 502, a service receives a request from a client. At block 504, the service determines, based on attribute(s) associated with the request, a first priority value for the request; the first priority value indicates a priority of the request relative to other requests received by the service.

At block 506, the service updates the request to include the first priority value, resulting in a first updated request. At block 508, the service propagates the first updated request to another service. At block 510, the service determines, based on attribute(s) associated with the first updated request, a second priority value for the first updated request; the second priority value indicates a priority of the first updated request relative to other requests received by the other service.

At block 512, the service updates the first updated request to include the second priority value, resulting in a second updated request. At block 514, the service propagates the second updated request to an additional service. As described herein, in various embodiments any number of the above actions may be performed by another service/application on behalf of the service (e.g., a proxy service or load balancer).

Figure 6:
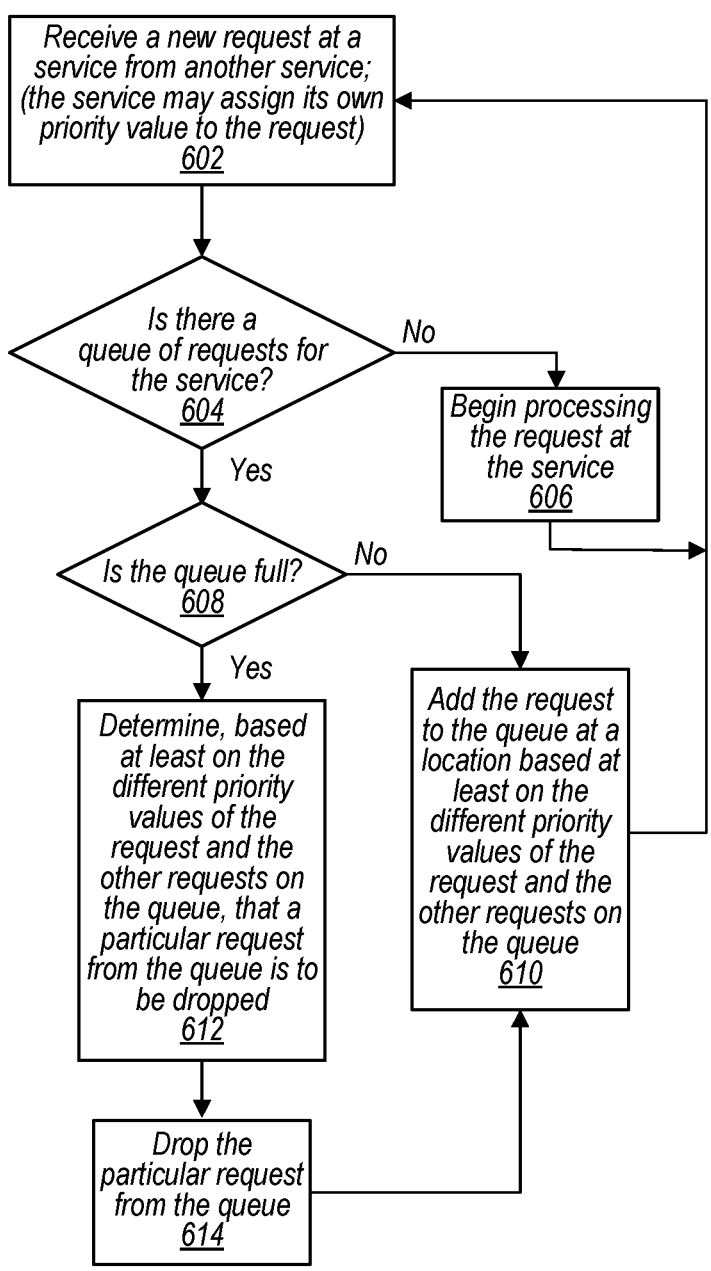
FIG. 6 is a flow diagram that illustrates a service that processes requests received from another service, according to some embodiments.

FIG. 6 is a flow diagram that illustrates a service that processes requests received from another service, according to some embodiments.

At block 602, a service receives a new request from another service; the service may assign its own priority value to the request, as described herein. At block 604, the service determines whether there is a queue of requests for the service. If not, then at block 606, the service begins processing the request. If not (e.g., the service is overloaded and/or too busy to begin processing all of the requests for the service), then at block 608, the service determines if the queue if full. If not, then at block 610, the service adds the request to the queue at a location based at least on the different priority values of the request and other requests that are in the queue (any other number of attributes of the request may be taken into account to determine the location to add the request, in embodiments).

At block 608, if the service determines that the queue is full, then at block 612, the service determines, based at least on the different priority values of the request and other requests that are in the queue (and/or any other number of attributes of the request), that a particular request in the queue is to be dropped from the queue. At block 614, the service drops the request from the queue. The process then proceeds to block 610, where the request is added to the queue as described above. Returning to block 612, in some cases the service may determine that the priority of the request is lower than any of the requests in the full queue and in response, the service may drop/reject the request without making any changes to the queue.

At any point in time, the service may be ready to begin processing the next request. In embodiments, the service will take the highest priority request from the queue. In some embodiments, the sequential ordering of the requests in the queue may take into account any number of trusted priority values of each of the requests (each trusted value may have been assigned by a different service). For example, the service may assign a different level of trust to each of the priority values, as described for FIGS. 2A and 3B.

In some embodiments, the service may also take into account the arrival times of the requests to determine the ordering of the requests in the queue. For example, the requests may be ordered by trusted priority and then by LIFO in order to determine the next request to be taken from the queue for processing by the service (e.g., a heap implementation, described below). The heap implementation below is an example of how requests may be ordered in a queue; however, in various embodiments, any other suitable technique may be used to determine an order for the requests, based on any of the priority values of each request, arrival times of each request, and/or any other number of attributes/data of each request.

In embodiments, each request struct has left/right for main heap, left/right for in client heap, and stack for arrival times. Each time a request is added to the heap, it is added to an index with the key being the trusted priority and client id; the value is a pointer to the top of the client heap for that trusted priority. If the request is the only one on the queue from that client at that priority, then it becomes the top of the heap and added to the main heap, and the arrival time is added to the stack; otherwise, the stack is copied from the top of the heap and the request is added to the client heap; references in the index and the main heap are updated to point to the top of the main heap, and the arrival time is added to the stack. When comparing a client heap to another item on the main heap, the arrival time at the top of the stack is used. When a client heap with more than one item would be popped off the top of the heap, instead the top of the client heap and the top arrival time is popped. Then the client heap is moved to the appropriate place in the main heap.

In embodiments, some or all of the components of the services of the provider network may operate within the context of an event-driven execution environment. For example, one or more of the requests sent from a client to a service of the provider network may be assigned to respective events, such that a particular service or function is triggered in response to detection, by the event-driven execution environment, of an event assigned to the particular service or function (e.g., receiving a request from a client device).

Any of various computer systems may be configured to implement processes associated with the provider network, services, or any other component of the above figures. For example, FIG. 7 is a block diagram illustrating an example computer system that implements some or all of the techniques described herein, according to some embodiments.

Figure 7:
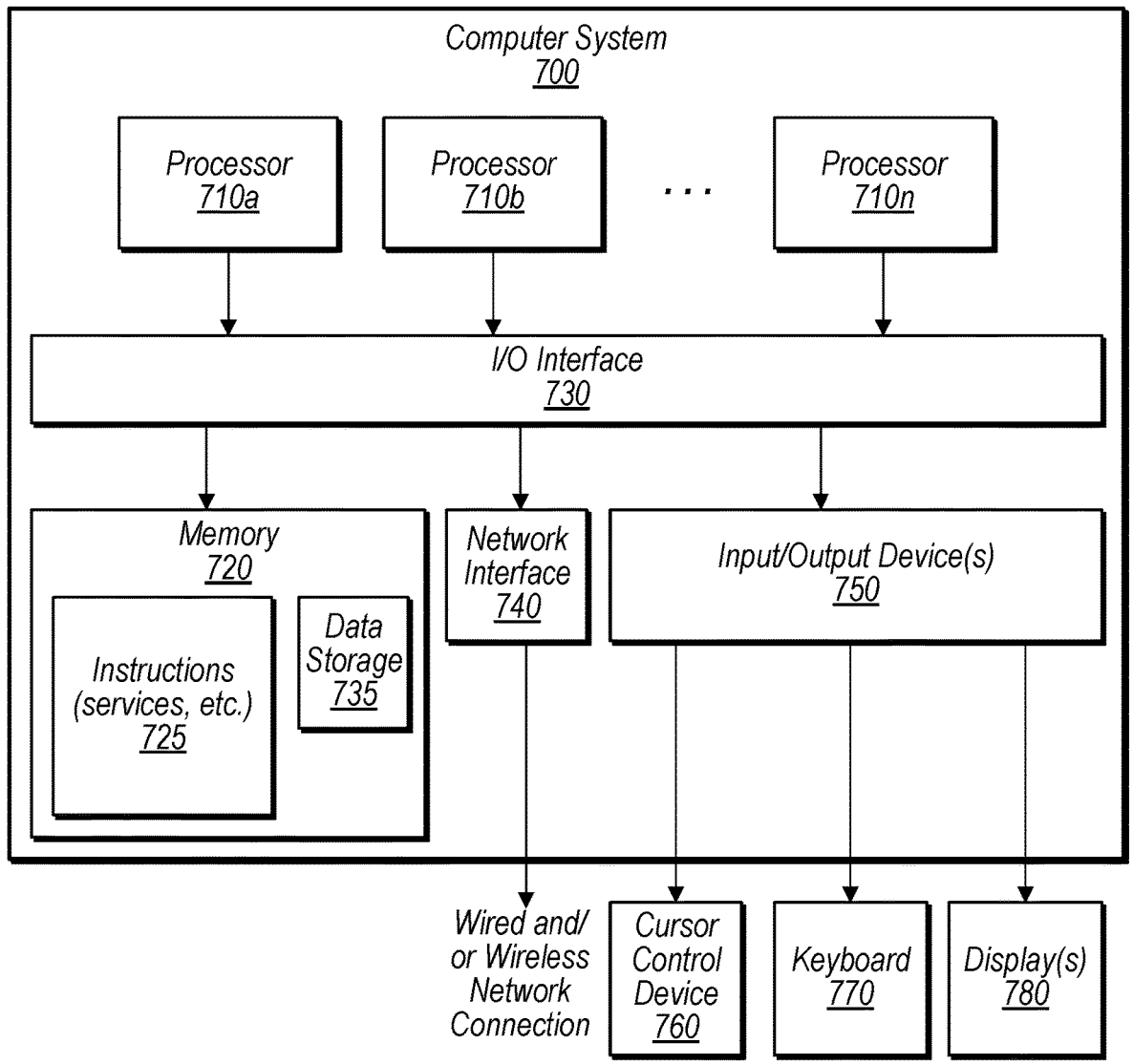
FIG. 7 is a block diagram illustrating an example computer system that implements some or all of the techniques described herein, according to some embodiments.

In various embodiments, the provider network or any other service/component of any of FIGS. 1-6 may each include one or more computer systems 700 such as that illustrated in FIG. 7. In embodiments, the provider network or any other component may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x 106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network (e.g., the services) or client network (e.g., the devices) are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710).

In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example. In particular, network interface 740 may be configured to allow communication between computer system 700 and/or various I/O devices 750. I/O devices 750 may include scanning devices, display devices, input devices and/or other communication devices, as described herein.

Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above.

However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730.

A computer-readable storage medium may also include any volatile or non-volatile media such as RAM (e.g., SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 780 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
  one or more processors; and
  one or more memories, wherein the one or more memories have stored thereon instructions, which when executed by the one or more processors, cause the one or more processors to implement:
    a service of a provider network, wherein the service is configured to:
      receive a request from a client;
      determine, based on one or more attributes associated with the request, a first priority value for the request, wherein the first priority value indicates a priority of the request relative to other requests received by the service;
      update the request to include the first priority value to generate a first updated request; and
      propagate the first updated request to another service of the provider network; and
    the other service of the provider network, wherein the other service is configured to:
      receive the first updated request from the service;
      determine, based on one or more of attributes associated with the first updated request, a second priority value for the first updated request, wherein the second priority value indicates a priority of the first updated request relative to other requests received by the other service;
      update the first updated request, which was received from the service by the other service, to include the second priority value determined by the other service, to generate a second updated request that comprises the first priority value assigned by the service and the second priority value assigned by the other service after the first priority value was assigned by the service; and
      propagate the second updated request to an additional service of the provider network.

2. The system as recited in claim 1, wherein the other service is further configured to:
  receive a plurality of other requests from the service and one or more different services, wherein respective requests of the plurality of other requests comprises a respective first priority value assigned by the service;
  determine, based at least on the first priority value of the first updated request and on the respective first priority values of the plurality of other requests, a sequential order of the first updated request and the plurality of other requests; and
  process the first updated request and the plurality of other requests according to the sequential order.

3. The system as recited in claim 2, wherein the other service is further configured to:
  receive an additional request from the service or one of the other services;

determine, based at least on the first priority value of the first updated request, the respective first priority values of the other requests, and a first priority value assigned by the service to the additional request, that a particular one of the other requests is to be rejected; and in response to the determination that the particular request is to be rejected, reject the particular request.

4. The system as recited in claim 1, wherein the service is configured to:

trust the first priority value from the service and trust the second priority value from the other service at a lower level of trust than the first priority value.

5. The system as recited in claim 1, wherein the additional service is configured to:

receive the second updated request from the other service;

receive a plurality of different requests from a different service, wherein respective requests of the plurality of different requests comprises a respective first priority value assigned by the service and a respective second priority value assigned by the different service;

determine, based at least on the respective second priority values of the plurality of different requests, a sequential order of the plurality of different requests;

determine, based at least on the first priority value of the second updated request and on the respective first priority values of the plurality of different requests, another sequential order of the second updated request with respect to the plurality of different requests; and process the second updated request and the plurality of different requests according to the sequential order of the plurality of different requests and the other sequential order of the second updated request with respect to the plurality of different requests.

6. A method, comprising:

performing, by one or more computing devices of a provider network:

receiving a request for a service from another service, wherein the request comprises a priority value, and wherein the priority value comprises a first priority value that indicates a priority of the request relative to other requests received by the other service;

determining, based on one or more attributes associated with the request, a second priority value for the request, wherein the second priority value indicates a priority of the request relative to other requests received by the service;

updating the request, which was received from the other service by the service, to include the second priority value determined by the service, to generate a first updated request that comprises the first priority value assigned by the other service and the second priority value assigned by the service after the first priority value was assigned by the other service; and propagating the first updated request from the service to an additional service.

7. The method as recited in claim 6, further comprising performing, by the one or more computing devices:

receiving the first updated request for the additional service and a plurality of other requests for the additional service from one or more different services, wherein respective requests of the plurality of other requests comprises a respective first priority value assigned by the other service;

determining, based at least on the first priority value of the first updated request and on the respective first priority values of the plurality of other requests, a sequential order of the first updated request and the plurality of other requests; and causing the first updated request and the plurality of other requests to be processed by the additional service according to the sequential order.

8. The method as recited in claim 7, further comprising performing, by the one or more computing devices:

determining that the additional service is unable to begin processing the first updated request and the plurality of other requests; and in response to determining that the additional service is unable to begin processing the first updated request and the plurality of other requests, determining the sequential order of the first updated request and the plurality of other requests.

9. The method as recited in claim 7, wherein causing the first updated request and the plurality of other requests to be processed by the additional service according to the sequential order comprises:

adding the first updated request and the plurality of other requests to a queue according to the sequential order, wherein the queue is implemented by a proxy service, a load balancer, or the additional service.

10. The method as recited in claim 9, further comprising performing, by the one or more computing devices:

receiving an additional request from the service or from one of the different services, wherein the additional request comprises a first priority value assigned by the other service;

determining that a first priority value of a particular one of the other requests is lower than the first priority value of the additional request and any other first priority values of requests of the queue;

in response to determining that the first priority value of the particular other request is lower than the first priority value of the additional request and any other first priority values of requests of the queue:

dropping the particular other request from the queue; and adding the additional request to the queue.

11. The method as recited in claim 6, wherein updating the request to include the second priority value comprises one or more of:

updating the priority value of a header of the request to include the second priority value, or appending the second priority value to the first priority value of the request.

12. The method as recited in claim 6, wherein the one or more attributes associated with the request comprises a uniform resource locator (URL) prefix of the request.

13. The method as recited in claim 12, wherein the first priority value comprises a numerical value between 0 and 1 and is represented in the first updated request in a binary decimal format, and wherein the second priority value comprises a different numerical value between 0 and 1 and is represented in the first updated request in the binary decimal format.

14. The method as recited in claim 13, wherein receiving the request for the service, determining the second priority value for the request, or updating the request to include the second priority value is performed by one or more of:

a proxy service, a load balancer, or the service.

15. One or more non-transitory computer-accessible storage media storing program instructions that when executed on or across one or more processors cause the one or more processors to implement a service to:

receive a request from another service, wherein the request comprises a priority value, and wherein the priority value comprises a first priority value that indicates a priority of the request relative to other requests received by the other service;

determine, based on one or more attributes associated with the request, a second priority value for the request, wherein the second priority value indicates a priority of the request relative to other requests received by the service;

update the request, which was received from the other service by the service, to include the second priority value determined by the service, to generate a first updated request that comprises the first priority value assigned by the other service and the second priority value assigned by the service after the first priority value was assigned by the other service; and propagate the first updated request to an additional service.

16. The one or more storage media as recited in claim 15, wherein the program instructions when executed on or across the one or more processors further cause the one or more processors to implement the service to:

receive the request and a plurality of other requests from one or more different services, wherein respective requests of the plurality of other requests comprises a respective first priority value assigned by the other service;

determine, based at least on the first priority value of the request and on the respective first priority values of the plurality of other requests, a sequential order of the request and the plurality of other requests; and process the request and the plurality of other requests according to the sequential order.

17. The one or more storage media as recited in claim 16, wherein the plurality of other requests comprises a group of requests from a particular service that respectively comprises a second priority value assigned by the particular service, and wherein to determine the sequential order of the request and the plurality of other requests, the program instructions when executed on or across the one or more processors further cause the one or more processors to implement the service to:

determine, based at least on the respective second priority values of the group of requests from the particular service, another sequential order of the group of requests from the particular service; and determine, based at least on the first priority value of the request, the respective first priority values of the plurality of other requests, and the other sequential order of the group of requests, the sequential order of the request and the plurality of other requests.

18. The one or more storage media as recited in claim 16, wherein the service is configured to trust the first priority values assigned by the other service in order to determine sequential order of different requests received by the other service.

19. The one or more storage media as recited in claim 15, wherein to generate the first updated request, the program instructions when executed on or across the one or more processors further cause the one or more processors to implement the service to:

update the request to include an identifier of the service.

20. The one or more storage media as recited in claim 19, wherein to generate the first updated request, the program instructions when executed on or across the one or more processors further cause the one or more processors to implement the service to:

update the request to include an indication of a size of the second priority value.

* * * * *